Patented Feb. 23, 1943

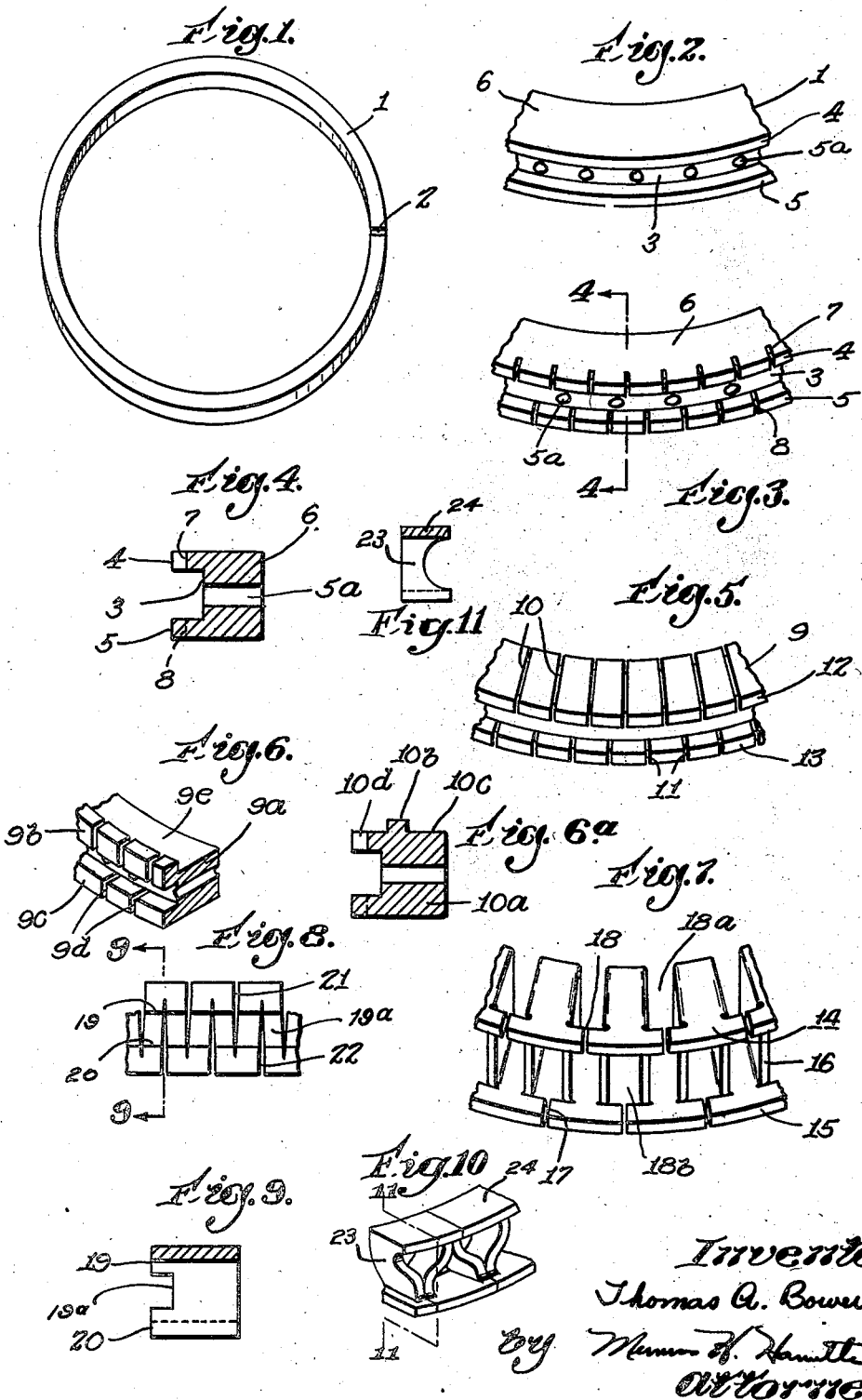

2,311,727

UNITED STATES PATENT OFFICE 2,311,727

INTERRUPTED OIL RING

Thomas A. Bowers, Boston, Mass., assignor to Power Research Corporation, Boston, Mass., a corporation of Massachusetts Application November 25, 1939, Serial No. 306,097

1 Claim. (Cl. 309—45)

This invention relates to piston rings and more especially to piston rings of the oil metering type.

During reciprocation of a piston in a cylinder, it is necessary that a sufficient amount of oil be maintained on the cylinder wall to insure suitable lubrication of piston rings. In providing for this lubrication, with oil metering rings, difficulty arises from too much oil being left on the cylinder periphery and also from oil passing on to the top of the cylinder. As a result, the lubricant becomes burned or carbonized, excess consumption of oil may occur, and injurious effects develop on various engine parts.

It is a principal object of the present invention to improve piston rings of the class employed for metering oil in cylinders, and to devise ring structures which are capable of effecting more efficient distribution of oil on a cylinder periphery with a view to reducing excess consumption and carbonization of oil, and to preventing as far as possible passage of oil into the top of a cylinder.

The nature and objects of the invention will be readily understood from the following description when read in connection with the accompanying drawing, and the novel features of the invention will be more particularly pointed out in the appended claim.

In the accompanying drawing:

Fig. 1 is a perspective view illustrating a C-type piston ring employed in effecting one embodiment of the invention.

Fig. 2 is a fragmentary perspective view of a piston ring, similar to that shown in Fig. 1, recessed to provide oil scraping edges and being illustrative of a step in effecting the invention.

Fig. 3 is another fragmentary perspective view illustrating the step of further treating the oil scraping edges of the ring of Fig. 2 to produce a finished ring.

Fig. 4 is a cross section taken on the line 4—4 of Fig. 3.

Fig. 5 is a fragmentary perspective view of a modification of the invention.

Fig. 6 is a fragmentary perspective view illustrating another ring modification.

Fig. 6a is a symmetrical cross section of a piston ring illustrating still another ring modification.

Fig. 7 is a fragmentary perspective view of a piston ring modification fabricated from a strip of piston ring material.

Fig. 8 is a fragmentary elevational view of another piston ring modification formed from a strip of piston ring material;

Fig. 9 is a cross section taken on the line 9—9 of Fig. 8.

Fig. 10 is a perspective view of still another modification of piston ring; and

Fig. 11 is a cross section taken on the line 11—11 of Fig. 10.

Referring in detail to the drawing, Figs. 1-4, inclusive, relates to one ring embodiment of the invention and its method of manufacture. Figs. 5-11, inclusive, relate to modifications of the invention.

In Fig. 1 is illustrated a piston ring 1 having a gap 2. This ring is intended to be illustrative of any desirable piston ring construction, as for example that comprised by a cast iron C-type ring, which may be employed in making the ring of my invention. As illustrated in Fig. 2, ring 1 is recessed at 3 along its outer periphery to provide oil scraping edges 4 and 5. Also oil passages 5a of conventional nature may be radially formed through the ring which are adapted to pass oil from the ring groove through openings in the piston and thence to the crankcase.

This well known double scraping edge construction effects more efficient oil scraping and tends to increase passage through the openings 5a of oil scraped from the cylinder wall by forming a reservoir between the edges in which the oil may be collected. However, while the double scraping edge ring effects more efficient oil scraping, such a construction, as well as others heretofore proposed, fails to adequately provide for return of scraped oil to the crankcase. The reason for this is partly due to the fact that relatively large amounts of oil collect on the top side of an oil scraping ring on the up stroke of the piston, as for example the top surface 6 of the ring shown in Fig. 2. All of this oil does not have sufficient time to pass over the top of the ring and down into the back of the piston ring groove and the oil therefore is pushed up into the head of the cylinder on the wall. In addition, a part of that oil which has been collected on the top of the ring during the up stroke of the piston remains and when the ring slaps in its groove as the piston changes from an up stroke to a down stroke, oil is extruded out onto the cylinder wall in undesirable amounts. Also, on the down stroke of a piston, a suction is created in the top of the cylinder, causing so-called "oil pumping" which tends to set up a suction for holding oil and preventing it from passing down through openings in the ring groove of the piston to the crankcase. As a result of these several factors, undesirable amounts of oil pass into the head of the piston with various ill effects.

In accordance with the present invention, I provide for oil to be more quickly passed away from the top of the ring and returned to the crankcase. This is effected by interrupting the scraping edges 4 and 5 with cuts or slots 7 and 8, as has been illustrated in Fig. 3 of the drawing, which act as passageways for oil to pass through the ring. The slots 7 and 8 may occur at suitable intervals in the scraping edges 4 and 5 and preferably the cuts 7 effected in scraping edge 4 will be located in staggered manner with respect to the cuts 8 located in the scraping edge 5. This interrupted oil scraping edge construction may be limited to use with a single oil scraping edge, as for instance conventional oil rings formed with beveled edges, or separate C-type oil scraping rings combined with cast iron spacing rings and expanders, or other types. Also, the slots may be desired to be of any suitable spacing, depth and size, and applied to various types of oil metering ring peripheries. It may be desired to provide the slotted scraping edge construction in only one of several rows of scraping edges in an oil ring and it is particularly contemplated that this may be effected in a ring having upper and lower circumferential oil scraping edges, with the lower circumferential edge being left unslotted and the upper edge being slotted.

It will be observed that the immediate effect of the slots 7 and 8 is to drain oil collected on the top sides of the scraping edges 4 and 5. In the case of the upper scraping edge 4, oil may pass through the slots 7 and the space between the scraping edges 4 and 5, and thence through the oil passageways 5a to the back of the piston ring groove. This makes possible relatively rapid dissipation of oil from the top side of the ring so that little oil remains to be pushed upward on the cylinder wall, or to be present on the top of the ring when the ring slaps in its groove. Less carbonization develops and more efficient return of oil to the crankcase is constantly carried out.

In addition, the slots 7 and 8 to tend to reduce development of suction or "oil pumping" in the head of the cylinder on the down stroke of the piston by providing openings between the ring and cylinder wall which breaks the seal therebetween and equalizes pressure in the area between the compression ring and oil ring and the area below the oil ring.

It will be noted that by arranging the slots 7 and 8 in the manner described, I effect a uniform scraping action on the cylinder walls and the points left unscraped by the openings 7, for example, in the scraping edge 4, are taken care of by the lower scraping edge 5. This operates to maintain a substantially uniform distribution of oil in a film state on the cylinder wall.

If desired, the slotted edges 7 and 8 may be modified as shown in Fig. 5, in which a ring 9 similar in construction to the ring shown in Fig. 3 is formed with slots 10 and 11 extending from the scraping edges 12 and 13 across the top and bottom respectively of the ring. These slots may also be of any desired size both in width and depth, subject only to the limitation that weakening of the ring should be avoided. Such a construction provides for improved passage of oil over the top of the ring and back to its groove, and particularly provides oil passageways when the top of the ring is in sealed relation with respect to the piston ring groove, as occurs on the up stroke of the piston.

It will be noted that these passageways also reduce extruding of oil due to "piston slap" as there is less surface for oil to collect on and the passageways comprise reservoirs for the oil to be extruded into. In addition to the advantages noted, it should be observed that the slots 10 comprise additional oil passageways which may be relied on to reduce ring failure from carbonization. The remarks in regard to scope and applicability of the ring in Fig. 3 are equally pertinent with respect to the ring modification of Fig. 5.

In accordance with a further aspect of the invention, a separate ring construction is provided for overcoming undesirable extruding or splashing of oil by piston ring slap. In Fig. 6 I have shown a ring 9a having its outer periphery grooved to present scraping edges 9b and 9c, and its edges formed with slots 9d. The top surface of ring 9a is cut away to provide a recessed top 9e, with the scraping edge 9b constituting an annular rib for effecting a seal with the top of the piston groove in the usual manner. It is pointed out that with such a construction, oil will be collected by the scraping edge 9b and passed back on to the recessed surface 9e. However, when the piston changes its stroke, slap against the piston groove will be taken up by the scraping edge 9b and its immediate rearward portion, and no contact of the relieved surfaces 9a with the groove surfaces occurs, which tends to substantially avoid any extruding or plashing of oil collected thereon.

If desired, the construction illustrated in Fig. 6 may be embodied in modified forms as for example that shown in Fig. 6a, in which a ring 10a has been formed with an annular rib 10b located on the top surface of the ring at a point between its inner and outer edge. As with the modification of Fig. 6, sealing is effected by the rib 10b while the remaining top surfaces 10c and 10d of the ring are maintained from slapping against the top surface of the ring groove. The interrupted edge construction already described may be combined with such a ring, as may also the annular openings shown. It may also be desired to provide various other forms of rings in which those surfaces, on which extrusion of oil from piston slap may occur, are reduced or cut away to present relatively small areas in which the rings bear in their grooves.

In Fig. 7 is illustrated another type of piston ring presenting interrupted circumferential rows of oil scraping edges substantially similar to the oil scraping edges described in connection with Figs. 1–6 inclusive. This ring is formed from a strip of piston ring material which has been stamped or otherwise formed to provide crown-forming portions 14 and 15 and web-forming portions 16. The crowns normally occur in a slightly separated position to present a plurality of interstices 17 and 18 which allow for the ring to be contracted upon itself. As a result of this ability to be contracted, a fabricated ring body may be compacted in a cylinder and exert a uniform radial wall pressure on a cylinder wall, tending to more accurately adhere to non-uniformities in a cylinder periphery. In addition to its radial expansibility, the ring is characterized by relatively large pasageways 18b.

These openings provide for improved and faster passage of oil through the ring and are adapted to facilitate circulation of oil through holes in the piston groove for eventually repassing into the crankcase.

By stamping out a strip of material in the manner shown, the web-forming portions 16 are weakened in relation to the crown-forming portions 14 and 15 so that the webs are rendered more susceptible to bending, thereby reducing the occurrence of undesirable bending in the crown portions.

The webs 16 may occur in any suitable position other than the circular position shown in Fig. 7, and maintain the weakened relation described. The rear portions of crowns 14 and 15 may be narrowed as shown in Fig. 7, if desired, to effect relatively wide openings 18a, which results in there remaining less surface area at the top of the ring to retain oil and extrude it against a piston groove surface. It should be observed that the structure of Fig. 7 is generally indicative of a second method of providing interrupted, separated, circumferential oil scraping edges and is particularly indicative of a method of making such edges by effecting edges in a strip of piston ring material to be used in the fabrication of a ring.

In Figs. 8 and 9, still another form of piston ring has been shown, having interrupted, separated, circumferential oil scraping edges. This ring is also a fabricated ring somewhat similar to that shown in Fig. 7, with the difference that the ribbon is folded and compacted upon itself in a closely adhering manner. The outer periphery of this ring is recessed to provide oil scraping edges 19 and 20 which are horizontally spaced apart by interstices 21 and 22 respectively, extending radially inward from the outer periphery of the ring to its inner periphery. If desired, the step of recessing the outer periphery may be effected with respect to other types of fabricated rings, as for example a ring 23, Figs. 10 and 11, folded such that it presents flat crown portions 24 occurring between points of folding. The recessing may also be effected in an annular manner as shown in Fig. 11. It is pointed out that this recessing operation, in addition to effecting separated rows of circumferential oil scraping edges which are horizontally separated by their interstices, also weakens the web-forming portions relative to the crown-forming portions, and this weakening effect is equally pertinent with respect to a closely compacted ring or to an open ring such as that just described.

It will be seen that by the invention there are effected material improvements in oil ring construction whereby more efficient oil scraping and circulation are effected. It will also be noted that the interrupted oil scraping edge construction which is important in carrying out these results, may be comprised by several different structures. It has been shown in a solid C-type ring in Figs. 1-4, inclusive; it has been shown effected by a stamped strip of piston ring material as indicated in Fig. 7; and it has been effected by recessing the periphery of fabricated structures. In each of these instances, the oil scraping edges are interrupted to provide for improved passage of oil through the ring while it is metering oil on a cylinder wall.

While I have shown a preferred embodiment of my invention, it should be understood that various changes may be resorted to while still adhering to the spirit of the invention.

I claim:

A piston ring comprising a ring body having a channel formed in its outer periphery, thereby forming an oil reservoir and radially extending oil scraping edges, upper and lower oil conducting surfaces of the ring continuous with the said oil scraping edges, said upper conducting surface having an annular rib located in spaced relation with respect to the inner and outer peripheral edges of the ring, said rib extending in a direction axially of the ring to provide a land surface for sealing the ring against a piston groove, the portion of the ring occurring between the rib and the inner peripheral edges thereof presenting a relieved annular surface over which oil may pass away from the annular rib.

THOMAS A. BOWERS.